UNITED STATES PATENT OFFICE.

CARL SALOMON, OF BRUNSWICK, GERMANY.

PROCESS OF ROASTING COFFEE.

SPECIFICATION forming part of Letters Patent No. 474,531, dated May 10, 1892.

Application filed November 30, 1891. Serial No. 413,516. (No specimens.)

*To all whom it may concern:*

Be it known that I, CARL SALOMON, of the city of Brunswick, in the German Empire, have invented a certain new and Improved Process of Separating the Offensively-Tasting Empyreumatic Oils and Gases from the Aromatic Constituents of Coffee, of which the following is a specification.

The object of the present invention is the separation of the offensively-tasting empyreumatic oils and gases from the aromatic constituents of the coffee.

In carrying out the invention I employ a high temperature for roasting the coffee for the purpose of completing such roasting within such a short period as would have hitherto been considered insufficient, and thereby to separate and expel at once the empyreumatic matters contained in or developed from the beans, and thereafter to fully develop within a few minutes the aromatic matters and to retain them in the beans by a sudden stoppage of the process.

In the methods hitherto in use for roasting coffee the employment of or the working with high temperatures has been carefully avoided for fear of too-highly roasting or even burning the beans. At low temperatures, however, the process of roasting is carried on very slowly and occupies a long time, during which no separation takes place of the simultaneously-developed empyreumatic and aromatic matters. By such simultaneous development a simultaneous expulsion of these matters takes place, and in order not to lose too much of the aroma the process of roasting has always been stopped after only a part of the empyreumatic matters has been expelled, and with this part already a considerable quantity of the aromatic compound has been lost. This accounts for the roasted coffee even of the better and higher-priced sorts, whether roasted in the trade or in the household, always possessing, instead of a pure aroma, a disagreeable smack or aftertaste, even if the coffee has been as equally and carefully roasted as possible. This evil effect or disadvantage of course occurs to an increased extent with coffee of a medium or inferior class or sort. Such defects in the product obtained have always been well known, and although many efforts have been made to remove such disadvantages the old inefficient system of roasting has nevertheless been carried on, because all trials in this direction have remained without result. It is only since I have entirely abstained from the old course and have carried on my trials in a totally-different direction that I have succeeded after many trials in finding the causes of the failure in the old direction and in obtaining, finally, roasted coffee without fault by performing the roasting according to my new process.

This new process is based upon the following observations: First, the complete conversion of those ingredients from which the empyreumatic matters will develop in roasting coffee is attainable at high temperature within such a short period as will not be sufficient for the development of the aroma; second, the acid gases and empyreumatic oils which are developed in this short period have to be removed immediately after their creation in a most energetic manner and most advantageously by suction; third, after, by the high temperature within the short period above mentioned, the empyreumatic matters have been all expelled a very short period in the so-conducted roasting process will arrive in which the development of the aroma will take place very quickly and will be easily perceptible by the sudden development of alkaline reacting gases. As soon as these gases appear the roasting process has to be stopped at once and the roasted product must immediately be cooled down to a temperature as low as possible for the purpose of closing the pores of the beans which have been opened by the heat and by the developed gases and of preventing by such closing the escape by evaporation of the aromatic oils developed in the beans.

It may be understood from what has been said in the last paragraph that although empyreumatic and aromatic matters will develop at nearly the same temperature in the roasting goods these matters, however, require a different length of preparatory period for decomposition up to their delivery. These incidents have never before been known, and the slight difference of time which lies between the complete expulsion of the empyreumatic matters and the sudden appearance of the aroma has been entirely overlooked, although the observation of it presents the only and the simplest means for conducting the roasting of the coffee, so that all empyreumatic matters are expelled and nothing is lost of the completely-developed aroma.

The above-mentioned different conversions of matters take place simultaneously in the old system of roasting, on account of the slow rising of the temperature and of the time of roasting, which is sometimes extended over one hour to one hour and a half, whereas these different conversions in my new process take place one after the other, and therefore separately from each other, if, in observing the above-mentioned main principles, the practical employment of which will be hereinafter described, the roasting process is carried on and completed within the short period of five to ten minutes at high temperature, according to the sort of coffee under treatment.

In carrying out the process the coffee to be roasted is not put into a cold drum or receptacle, but into a heated one, and is then treated directly by heating-gases. If in this manner the material to be roasted is heated quickly—say in about three to five minutes—up to about 300° to 350° centigrade and kept at this temperature, the roasting process will take place in the following manner: In the first instance the acid gases are driven out. They continue to be formed during the expulsion of the empyreumatic oils, properly speaking. These latter will develop from about the second minute of the regular roasting process and will have been expelled after the above-mentioned temperature has been employed during from three to five minutes. Later on, sometimes as early as the fourth minute, the conversion begins in which the aroma is created. This conversion will be terminated in a very short period, which can easily be ascertained by examining the gases drawn off to test their reacting quality, which may be easily done by a small sheet of curcuma or litmus paper. As soon as the time has arrived at which the aroma will completely develop but at which an expulsion has not yet taken place, the gases will show an alkaline reaction. This is the time to immediately and quickly cool down the roasting material from its high temperature. It is furthermore necessary, in order to obtain a product tasting perfectly pure, that the gaseous compounds distilled off during the roasting process should be immediately sucked away after their creation, or, still better, should be removed and replaced by an indifferent gas.

In order to be able to work the process just described, the apparatus hitherto in use will not prove to be sufficient. With drums which are heated from outside the heating of the material is carried on too slowly and too unequally. It is absolutely necessary for working the new process that the heating of the material be done directly by heating-gases and that these gases equally penetrate into the material to be roasted. For the latter purpose the material to be roasted has to be kept falling freely.

In order to cause the first heating of the coffee in a period as short as possible, the drum before being charged must be hot and must be kept so during charging. It is evident that the temperature must be capable of being carefully regulated. Again, the drum must be arranged to be suddenly discharged and during rotation, so that an after-roasting is avoided.

The apparatus which is the subject of my United States Patent No. 461,550, dated October 20, 1891, will be found suitable for working the present process. It must, however, be stated that although the said apparatus will prove to be suitable for working the new process of roasting, this working of the new process is not exclusively limited to this construction of apparatus.

The new invention consists, as may be understood from the above statements, in carrying out the process of roasting coffee by the employment of direct heating gases at so high a temperature that within a few minutes the expulsion of the empyreumatic matters is completed and that thereafter the development of aromatic compounds separately from that of the empyreumatic ones takes place and is completed in so short a period that the roasting material may be cooled down before any escape of the valuable aromatic matters takes place. It is well to observe that the heating-gases employed must be of such character containing a high percentage of carbonic acid or an admixture of other incombustible gases that with such high temperature no injurious decomposition of the beans will take place by the action of oxygen.

The result of the improved process is a surprising one. The lower or inferior sorts of Santos coffee will, if treated by this new roasting process, give a product which, as far as good odor and purity of taste is concerned, is equal or even superior to the best sorts of Santos if these latter are roasted in the old way. Again, the coffee roasted by the improved process will show an increase in the quantity of extract of about twenty-five per cent. This result may be accounted for by the fact that with all former roasting processes the soluble extract matters have been produced in much less quantity because of the employment of a very much lower temperature, and owing to the long duration of those roasting processes the said matters have partly been decomposed or destroyed and have been converted into volatile substances.

What I claim as my invention, and desire to secure by Letters Patent, is—

The process of roasting coffee, consisting in first exposing it directly to contact with gases heated at a high temperature, whereby the empyreumatic matters are driven off but the aromatic qualities are developed, then on the development of the aromatic matters, as indicated by the alkaline reaction of the escaping gases, quickly cooling the roasted material, all substantially as herein set forth.

In testimony that I claim the foregoing as my invention I have signed my name in presence of two subscribing witnesses.

CARL SALOMON.

Witnesses:
JOHANNES LEFELDT,
WILLIAM G. SPALDING.